Nov. 8, 1960     L. I. KAPLAN     2,959,377
AIRFOIL STRUCTURE WITH BOUNDARY LAYER CONTROL MEANS
Filed March 15, 1957
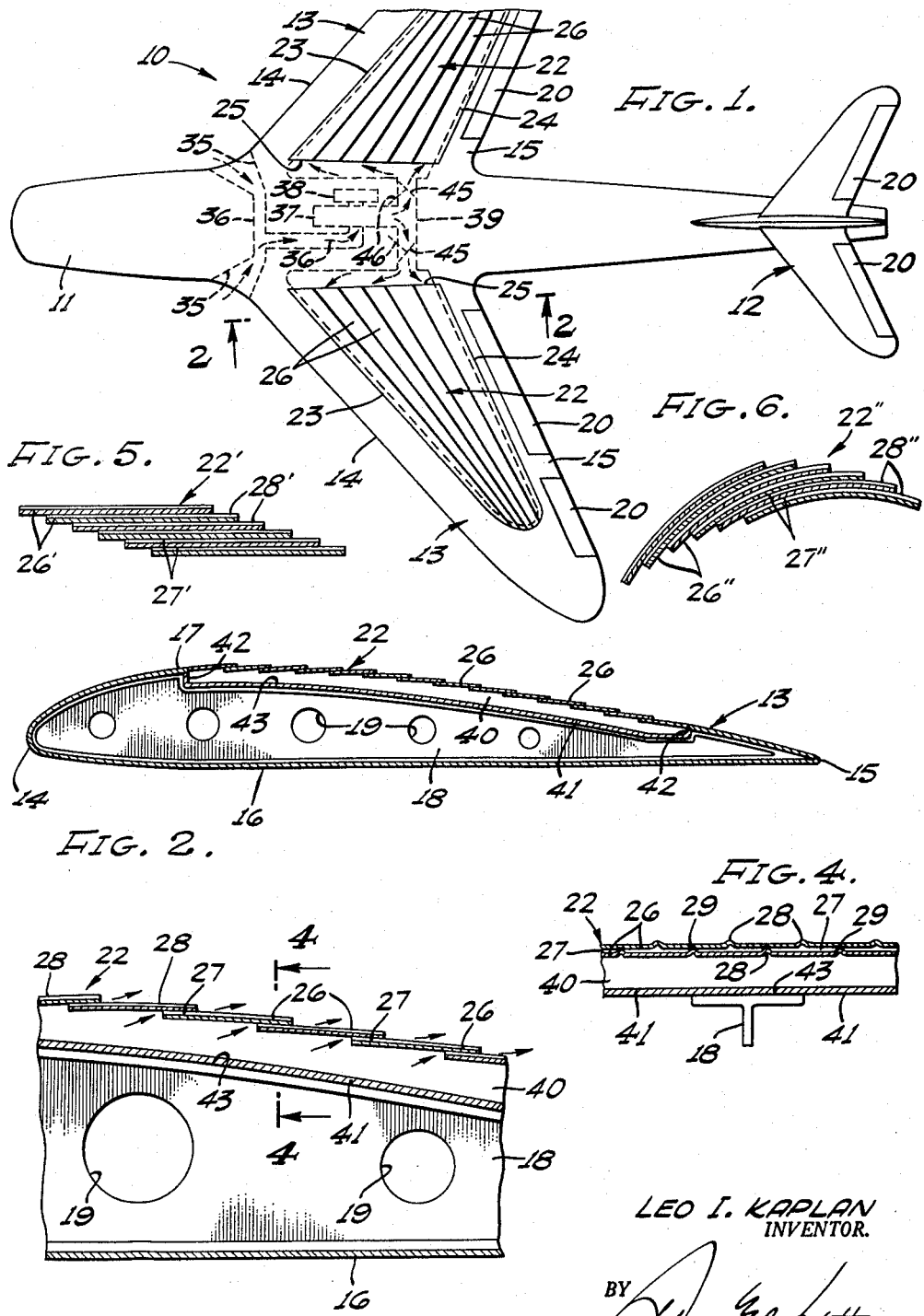
LEO I. KAPLAN
INVENTOR.
BY
ATTORNEYS

United States Patent Office 2,959,377
Patented Nov. 8, 1960

2,959,377

AIRFOIL STRUCTURE WITH BOUNDARY LAYER CONTROL MEANS

Leo I. Kaplan, Sunland, Calif., assignor to Poly Industries, Inc., Pacoima, Calif., a corporation of California Filed Mar. 15, 1957, Ser. No. 646,252

11 Claims. (Cl. 244—40)

This invention relates to fluid dynamic structures and more particularly to a new and improved structure of that type adapted to energize the boundary layer of the slip stream in a beneficial and superior manner and for controlling the temperature rise of the structure.

It is known that one of the major factors contributing to the inefficiency of airfoils and the like fluid dynamic structures is the frictional drag imposed by the airfoil surface upon the boundary layer of air flowing in contact with it. Though thin this layer has strata which tend to flow at different velocities depending upon the proximity of each of the airfoil surface and the frictional effect of the airfoil. This creates a state of turbulence within the boundary layer and internal frictional losses between strata in addition to those caused by contact with the airfoil surface itself. Numerous structures have been proposed to improve these undesirable conditions by appropriate use of air to prevent differential flow of boundary layer stratum, turbulence, and the stalling of strata close to or in contact with the airfoil. In one classification of these structures, air is ejected into the boundary layer in the general direction of the slip stream flow through slots extending lengthwise of the airfoil. In another classification, air is drawn into the airfoil from the boundary layer, and in a third mode of treatment, air is drawn into the airfoil from one area and subsequently returned to a different area of the boundary layer. Although these expedients have improved the efficiency of the boundary layer flow to some extent, each is subject to certain disadvantages not present in the present invention. For example, prior designs providing for the energization of the boundary layer in each of the three manners referred to employ a small number of slots extending lengthwise of the wing and having a large cross-sectional area. These deliver quantities of air far in excess to that found to be necessary for efficient energizing action if carried out in accordance with the principles of the present invention. Additionally, large quantities of energizing air are difficult to control in a manner which avoids creating turbulence in the slip stream—the very conditions sought to be remedied.

The present invention provides a fluid dynamic structure such as an airfoil having a unique grille provided with a multiplicity of closely spaced air passages distributed over a major portion of the low pressure side of the airfoil and utilizing a minimum quantity of air delivered tangentially across the airfoil surface to energize the boundary layer in a highly efficient manner and to effect cooling of the grille by transpiration.

It is a principal object of the present invention to provide an improved fluid dynamic structure which avoids the numerous disadvantages of prior structures in this field and having a novel porous surface for energizing the boundary layer and for controlling the temperature rise of the structure.

A further object of the invention is to provide a fluid dynamic structure having a grille coextensive with a major portion of its low pressure side designed to deliver a multiplicity of streams of air tangentially into the boundary layer to promote the flow thereof across the structure.

Another object of the invention is to provide a new and improved porous material for separating a quiescent zone from a zone containing a relatively moving medium and for effecting a transfer of fluid from the quiescent zone into the moving medium efficiently and in a manner to promote the cooling of the porous material.

A further object of the invention is to provide an airfoil structure having an exterior surface formed by overlapping strips arranged in echelon and closely spaced apart to form air passages discharging thin streams of air in contact with the exterior surface of the strips and in the direction of flow of a boundary layer passing thereover.

Still another object of the invention is to provide new and improved means for energizing the boundary layer flowing over an airfoil and utilizing a low velocity substantially continuous layer of air introduced between the airfoil surface and the inner stratum of the boundary layer.

Another object of the invention is to provide an aerodynamic structure having means for supplying a thin layer of air tangentially along the surface of the structure in the direction of the slip stream flow for the purpose of preventing excessive temperature rise of the structure by frictional contact wtih the slip stream and for preventing stalling and turbulence in the boundary layer portion of said slip stream.

These and other more specific objects will appear upon reading the following specification and claims and upon considering in connection therewith the attached drawing to which they relate.

Referring now to the drawing in which a preferred embodiment of the invention is illustrated:

Figure 1 is a top plan view of an aircraft incorporating the present invention, one wing tip being broken away;

Figure 2 is a sectional view through one wing on line 2—2 of Figure 1;

Figure 3 is an enlarged view of a portion of Figure 2;

Figure 4 is a sectional view taken on line 4—4 of Figure 3;

Figure 5 is a fragmentary transverse section through an alternate grille construction; and Figure 6 is a view similar to Figure 5 but wherein the individual strips are curved in the direction of fluid flow thereacross.

Referring again to the drawing, the present invention is shown incorporated by way of example in an aircraft designated generally 10 and comprising an elongated fuselage 11 having a suitable tail assembly 12 and a pair of swept-back wings 13, 13. Each wing comprises a relatively thick rounded leading edge 14 and a relatively thin tapered trailing edge 15 interconnected by aerodynamically contoured lower and upper surfaces 16 and 17, respectively, the lower surface 16 being commonly referred to as a high pressure surface and surface 17 being known as the low pressure surface. The upper and lower surfaces 16 and 17 are rigidly supported in a conventional manner as by spaced ribs 18 extending transversely of the wing, each rib having cut-outs 19 spaced along its mid-section. The trailing edges of the wings as well as of the tail fins are provided with ailerons 20 pivotally supported from their inner longitudinal edges in accordance with conventional practice.

The novel porous grille forming the principal feature of this invention, generally designated 22, forms a major portion of the low pressure surface 17 of each wing, the marginal edges 23, 24 and 25 of the grille lying opposite the adjacent peripheral edges of the wing as is clearly shown in Figure 1. The grille surface proper is formed by a large number of narrow strips 26 of thin sheets of material such as aluminum arranged lengthwise of the wing in overlapping spaced relation to provide narrow air passages 27 therebetween. It is important that the thin strips 26 be rigidly secured together at frequent intervals with their facing surfaces parallel to one another to form outlet ports for the energizing and temperature control fluid. According to a preferred mode of securing the strips together, each strip is deformed transversely of its length to provide closely spaced crimps, ridges or ribs 28 having a height corresponding to the desired spacing between strips, the crests of the ribs being welded at 29 to the surface of the overlying strip. In positioning the strips for welding, care is exercised to stagger the ribs uniformly to provide a grille 22 having maximum strength. Other appropriate modes of securing the strips together as by metal adhesives, riveting and the like may be employed. To avoid confusing the showing, no attempt has been made to illustrate the number of strips 26 actually employed in constructing a suitable grille for an aircraft wing, it being understood that many times the number illustrated are used in practice. It will also be understood that the extent to which one strip overlaps another may be varied over a wide range, a minimum amount of overlapping having been illustrated in the interest of greater clarity.

The thickness of strips 26 and the spacing thereof from one another to provide the fluid passages 27 are important. It has been found that the most beneficial results in preventing stalling and turbulent fluid flow conditions are obtained if the thickness of the strips and the spacing therebetween are similar to one another and within the range of 0.001 to 0.005 inch.

Referring to Figure 1, a suitable means for supplying air as the energizing fluid to the inner side of grille 22 in each wing will be seen to include a pair of air intake scoops 35 located respectively at the forward junctions of wings 13 with the plane fuselage. It will be recognized that fluids other than air can be used including vapors, gases, products of combustion and the like, depending upon the particular application of the grille and the availability of an energizing and cooling medium. Scoops 35 open into a conduit 36 leading to the intake of a blower or compressor 37 driven by a motor 38. It is to be understood that the compressor or blower 37 is used for purposes of increasing the air pressure and that in flight and with air speeds above certain ranges it may be unnecessary because of the high pressure existing forwardly of scoops 35. The compressed air discharging from blower 37 may be conducted to a storage tank if desired, but as herein shown passes into a distributing main 39 discharging into each wing or preferably into a distibuting chamber 40 underlying each air grille 22. If the hollow wings 13 are sealed against air escape except through grill 22, the air-distributing main 39 can open directly into the wing cavities for distribution lengthwise thereof through cut-outs 19 in wing ribs 18. In the design here illustrated, however, main 39 discharges into a low-height air-distributing chamber 40 in each wing formed by a metal sheet 41 having upturned rims 42 sealed against the lower rim edges of grille 22, sheet 41 being supported in a depression 43 extending along the upper edge of wing ribs 18. If the wing cavity is to be employed as the air-distributing duct, sheet 41 is omitted and the upper edges of ribs 18 lie in close supporting relation to the interior side of porous grille 22.

Irrespective of whether the compressed air is distributed directly to the underside of the air grilles from main 39 or from a storage tank for the compressed air, the air flow is controlled by suitable regulating means such as valves 45 in main 39 located near each wing. Each valve has a handle 46 or other suitable means by which the pilot may adjust the setting in accordance with the need for energizing air under different flying conditions; the principal conditions necessitating adjustment of the valves are different speeds of the craft and flight at different altitudes.

To obtain the benefits of the present invention, motor 38 is started to drive air blower 37 whereupon air is drawn inwardly through scoops 35 and conduit 36 to the blower inlet. Air compressed by the blower then passes into the distributing chambers 40 beneath air grilles 22 by way of the distributing main 39 under the control of the air-regulating valves 45. These valves are adjusted to maintain an air pressure on the interior side of the grilles slightly higher than the pressure of the air in the thin boundary layer flowing over the grille from leading edge 14 to trailing edge 15 of the wing. Since the very thin passages 27 between the strips of the air grille have appreciable resistance to air flow, it will be evident that the air pressure on the inner side of the grille must be slightly higher than that in the boundary layer to compensate for the pressure loss due to this resistance. Because of the described substantially equal pressure conditions between the air issuing from passages 27 and the air in the boundary layer, it will be recognized that the volume of air issuing from the grille is very small, particularly in comparison with the volumes of energizing air required by prior boundary layer energizing devices. Consequently, it is feasible to energize the air over a major portion of the low pressure airfoil surface by means of relatively small capacity air-handling ducts. An important factor in minimizing the volume of energizing air is the exceedingly thin dimension of passages 27 which, as aforementioned, is preferably not greater than 0.005 inch.

As is best shown in Figures 3 and 4, the energizing air issues from passages 27 between the overlapping layers of strips 26 in substantially continuous films extending the full length and width of each grille and merges tangentially with the inner stratum of the boundary layer traveling in the direction of flow thereof. Contrary to what might reasonably be expected, these relatively slow moving films of energizing air do not promote turbulence in the inner strata of the high velocity boundary layer but instead effect a marked improvement in its velocity and general flow characteristics across the airfoil surface. Apparently the reason for this is that the moving films of energizing air serve as a very low inertia lubricant or film separating the boundary layer from the high friction surface of the wing. It is also believed that the direction of flow of this lubricating film in parallel with the boundary layer avoids disturbance of the air molecules in the latter and is a major factor contributing to the highly beneficial results obtained.

No less important than the energization of the boundary layer is the roll of the grille 22 in controlling the temperature rise of the grille and its supporting structure. This rise may be incurred either by heat transfer from a hot medium flowing over the grille or from the frictional drag of even a very cold medium moving at high velocity relative to the grille. Heating due to friction between an airfoil surface and the slip stream passing thereover presents a serious problem at high velocities in the supersonic range. In other applications of the porous material provided by this invention, the temperature rise may be due to the high temperature of the medium flowing therepast as is encountered, for example, in rocket engines. Irrespective of the source of heat, the present grille provides a thin but high strength structure of great porosity which is highly effective in separating the source of heat from an adjacent quiescent zone and which structure can be efficiently cooled by passing a small quantity of fluid through the grille from the quiescent zone. It will therefore be understood that in the specific application illustrated and described herein, the grille serves both to energize the boundary layer of a particular fluid dynamic structure and to prevent objectional temperature rise due primarily to frictional drag of the airfoil on the slip stream air. In other applications of the grille, both or either one of these functions may be served.

The manner in which the grille functions to prevent objectional temperature rises therein is believed to be as follows. Owing to the multiplicity of film-thin outlet openings through the grille and the high resistance offered by its very thin passages 27, the fluid medium passes therethrough slowly but steadily to produce cooling by transpiration. The medium not only has a very substantial capacity for absorbing and carrying away heat which would otherwise be absorbed by the grille and the adjacent structure, but this fluid provides a highly effective constantly renewed heat insulating film between the relatively flowing heat source medium and the grille. Of importance too, is the effect of the cooling medium in preventing turbulence in the layers of the rapidly moving heat source medium with which it comes in contact, a condition found to be a principal source of the temperature rise due to drag or friction effect. Stated differently, the tangentially discharging streams of cooling medium provide a lubricating film between the grille and the hot gaseous or other fluids flowing therepast which is most effective in reducing friction, the principal cause of turbulence.

From the foregoing it will be recognized that air grille 22 may be considered as formed by a stepped surface in which the individual steps are formed by the exposed upper surfaces of strips 26, and wherein the riser portions of the steps are formed by the downstream edges and spacing ribs 28 of the underlying strips. The ribs cooperate with the adjacent overlapping strips to provide a multiplicity of air films issuing through the faces of the riser portions and serve to direct the issuing air film in closely spaced parallel relation with the exterior surface of the next lower step. It should also be mentioned that as the flowing film of air passes beyond the trailing edge of one step, it merges with the film passing over the next lower step thereby forming a continuous film of energizing air overlying the entire grille.

The alternate preferred constructions illustrated in Figures 5 and 6 show modified grilles 22' and 22", respectively formed from multiple overlapping layers 26' and 26", strips 26' in Figure 5 being substantially flat and strips 26" in Figure 6 being curved crosswise of their width as is desirable for grilles covering arcuate aerodynamic surface areas. It will be understood that strips 26' and 26" have fluid flow passages 27' and 27" these being provided by spacing ribs 28' or 28" similarly to the mode of construction described above in connection with Figures 1 to 4. The thickness of the strips, the manner of fabrication and other details likewise will be understood as similar to those of the first described embodiment.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. A fluid dynamic structure having a grille coextensive with a major portion of one surface thereof, said grille comprising a plurality of overlapping strips of sheet material secured together in closely spaced relation to provide thin openings extending transversely of and between adjacent strips, the edges of said strips extending transversely of the direction of fluid flow thereacross whereby the discharge ends of said openings deliver a fluid medium tangentially into a boundary layer of a fluid flowing over said structure, said strips being deformed crosswise thereof with the deformations of one strip arranged out of alignment with those of an adjacent strip, the lateral edges of said strips being arranged in echelon, and means holding said strips rigidly secured together at closely spaced points lengthwise thereof.

2. A fluid dynamic structure having grille means forming an exterior surface area thereof, said grille means comprising a plurality of overlapping strips of material rigidly laminated together at spaced points lengthwise therealong through spacer means located between said strips and rigidly secured thereto to provide fluid passages a few mils thick open along the opposite transverse edges of said strips, said strips having an exterior edge arranged generally normally to the direction of air flow over said fluid dynamic structure, and means for bleeding a fluid medium from the interior ends of said fluid passages under slight pressure for flow in thin films through said passages for discharge tangentially into the inner stratum of the fluid flowing over the opposite surface of said structure and in the direction of flow of the last mentioned fluid over said structure.

3. A fluid dynamic structure as defined in claim 2 wherein the width of said thin fluid passages is approximately the same as the thickness of said strip material.

4. A fluid dynamic structure as defined in claim 2 wherein the width of said fluid passages is approximately within the range of 0.003 to 0.005 inch.

5. An airfoil structure having a leading edge and a trailing edge connected by relatively wide spaced apart surfaces, one of said surfaces having provision for the passage outwardly therethrough of a multiplicity of thin slow moving films of air under slight pressure and flowing substantially in the plane of the airfoil surface and discharging into the slip stream in the direction of flow thereof over said airfoil, a major portion of said one surface being formed by a plurality of strips of metal overlapping one another and secured immovably together in closely spaced relation by rigid spacer means cooperable with said strips to provide wide but thin passages a few mils thick open along the opposite lateral edges of said strips, one end of said passages opening to the hollow interior of said airfoil and the opposite end opening toward the trailing edge of said airfoil, the longitudinal axes of said passages lying parallel to one another and parallel to the exterior surface of the adjacent strip closer to the trailing edge of said airfoil.

6. An airfoil having an aerodynamically contoured low pressure surface between the leading and trailing edges thereof, high strength foraminous means underlying said low pressure surface, means effective to bleed films of boundary layer energizing air therethrough and supported exteriorly on said foraminous means and providing a thin stepped surface having riser portions facing toward said trailing edge, a multiplicity of film-thin air passages of fixed predetermined cross-section extending through said riser portions for delivering a multiplicity of overlapping thin films of energizing air at slow speed and under slight pressure toward said trailing edge in close parallel relation across said stepped surfaces between said risers.

7. An airfoil as defined in claim 6 wherein said stepped surface is formed from thin sheet metal having upstanding ribs from the stepped surface portions thereof extending in the direction of air flow between the leading and trailing edges of said airfoil.

8. A fluid dynamic structure having grille means forming an exterior surface area thereof, said grille means comprising a plurality of overlapping strips of material formed with shallow widely separated corrugations extending transversely thereof with the crests thereof rigidly laminated to the juxtaposed surface of the adjacent one of said strips to provide a multiplicity of fluid passages a few mils thick open along the opposite transverse edges of said strips, said strips having an exterior edge arranged generally normal to the direction of fluid flow over said fluid dynamic structure, and means for bleeding a fluid medium from the interior ends of said fluid passages under slight pressure for flow in thin films through said passages for discharge tangentially into the inner stratum of the fluid flowing over the opposite surface of said structure and in the direction of flow of the last mentioned fluid over said structure.

9. A fluid dynamic structure as defined in claim 8 characterized in that said means for bleeding a fluid medium through said grille means includes means for delivering said fluid medium to the interior side of said grille means in cool condition whereby the same is effective to cool said grille means as the fluid medium bleeds therethrough.

10. A fluid dynamic structure as defined in claim 8 characterized in the provision of means for supplying said fluid medium to the interior ends of said fluid passages of said grille means in cold condition for flow through said passages in thin films, and wherein said films cooperate with one another to provide a moving continually replenished cool heat insulating layer of fluid medium flowing in direct contact with the exterior of said grille means and between said grille means and the surrounding medium exterior thereto.

11. A fluid dynamic structure as defined in claim 1 characterized in the provision of means for bleeding a fluid medium outwardly through said grille from a cold source of said fluid medium, said cold fluid medium bleeding slowly through said thin openings under slight pressure and being effective to cool said grille and to provide a continually replenished layer of moving fluid adjacent the exterior of said grille which layer has effective heat insulating properties.

References Cited in the file of this patent
UNITED STATES PATENTS

| | | |
|---|---|---|
| 2,267,927 | Kightlinger | Dec. 30, 1941 |
| 2,396,911 | Anxionnaz et al. | Mar. 19, 1946 |

FOREIGN PATENTS

| | | |
|---|---|---|
| 631,478 | Germany | June 22, 1936 |